(12) United States Patent
Nie et al.

(10) Patent No.: US 10,213,877 B2
(45) Date of Patent: Feb. 26, 2019

(54) ALUMINUM ALLOY AND CORRESPONDING HEAT TREATMENT PROCESS APPLIED TO MANUFACTURE ALUMINUM/STEEL CLADDING PLATES RESISTANT TO HIGH TEMPERATURE BRAZING

(71) Applicant: BEIJING UNIVERSITY OF TECHNOLOGY, Beijing (CN)

(72) Inventors: Zuoren Nie, Beijing (CN); Kunyuan Gao, Beijing (CN); Shengping Wen, Beijing (CN); Hui Huang, Beijing (CN); Wenxia Ru, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 46 days.

(21) Appl. No.: 15/270,951

(22) Filed: Sep. 20, 2016

(65) Prior Publication Data

US 2017/0008132 A1    Jan. 12, 2017

Related U.S. Application Data

(63) Continuation of application No. PCT/CN2015/074548, filed on Mar. 19, 2015.

(30) Foreign Application Priority Data

Mar. 24, 2014   (CN) ........................... 2014 1 0112198
Mar. 24, 2014   (CN) ........................... 2014 1 0112213

(51) Int. Cl.
   *B32B 15/01*       (2006.01)
   *B23K 35/22*      (2006.01)
   (Continued)

(52) U.S. Cl.
   CPC ............ *B23K 35/22* (2013.01); *B32B 15/012* (2013.01); *C21D 9/50* (2013.01); *C22C 21/00* (2013.01);
   (Continued)

(58) Field of Classification Search
   None
   See application file for complete search history.

(56) References Cited

U.S. PATENT DOCUMENTS

| | | | |
|---|---|---|---|
| 2,965,963 A * | 12/1960 | Batz | B23K 20/2275 148/503 |
| 3,705,023 A | 12/1972 | Fister | 29/196.2 |
| 2007/0151636 A1* | 7/2007 | Buerger | C22C 21/10 148/552 |

FOREIGN PATENT DOCUMENTS

| | | | |
|---|---|---|---|
| CN | 100467642 | * | 3/2009 |
| CN | 101722372 A | | 6/2010 |

(Continued)

OTHER PUBLICATIONS

International Search Report of corresponding International PCT Application No. PCT/CN2015/074548, dated Jun. 26, 2015.

*Primary Examiner* — Daniel J. Schleis
(74) *Attorney, Agent, or Firm* — J.C. Patents

(57) ABSTRACT

A kind of aluminum alloy and corresponding heat treatment process applied to manufacturing aluminum/steel cladding plates which are resistant to high temperature brazing belong to alloy materials technology field. In the aluminum/steel cladding plates, the aluminum part was alloyed with 0.76%~0.78% Si and 0.055~0.10% Er in weight percent and the rest was Al and some unavoidable impurity. The Steel part was 08Al steel. After cladding cold rolling with deformation of 55%±2%, the aluminum/steel cladding plates were annealed at 510~535° C. for different times. Then simulated brazing process was performed to optimize the range of annealing time and temperature. The so produced Al/St cladding plates could not only effectively solve the low interface strength in Al/St cladding plates, but also meet the mechanical properties which were necessary for further processing of Al/St cladding plates. It was provided a kind (Continued)

of aluminum alloy and corresponding heat treatment process which could effectively solve the low bonding strength under the condition of high temperature brazing because of the existence of brittle Fe—Al phases.

4 Claims, 4 Drawing Sheets

(51) Int. Cl.
| | | |
|---|---|---|
| *C22C 21/02* | (2006.01) | |
| *C22F 1/043* | (2006.01) | |
| *C21D 9/50* | (2006.01) | |
| *C22C 21/00* | (2006.01) | |
| *C22F 1/04* | (2006.01) | |
| C21D 9/52 | (2006.01) | |

(52) U.S. Cl.
CPC ............ *C22C 21/02* (2013.01); *C22F 1/04* (2013.01); *C22F 1/043* (2013.01); *C21D 9/52* (2013.01); *C21D 2251/00* (2013.01)

(56) References Cited

FOREIGN PATENT DOCUMENTS

| CN | 102019727 A | 4/2011 |
| CN | 102321834 A | 1/2012 |
| CN | 103469015 A | 12/2013 |
| CN | 103484728 A | 1/2014 |
| CN | 103882269 A | 6/2014 |
| CN | 103924174 A | 7/2014 |

* cited by examiner

ALUMINUM ALLOY AND CORRESPONDING HEAT TREATMENT PROCESS APPLIED TO MANUFACTURE ALUMINUM/STEEL CLADDING PLATES RESISTANT TO HIGH TEMPERATURE BRAZING

CROSS REFERENCE TO RELATED APPLICATION

This application is a continuation application of international application number PCT/CN2015/074548, filed on Mar. 19, 2015, which in turn claims the priority benefit of Chinese Patent Application No. 201410112198.2, filed on Mar. 24, 2014 and Chinese Patent Application No. 201410112213.3, filed on Mar. 24, 2014, the contents of the above identified applications are hereby incorporated by reference in its entirety.

TECHNICAL FIELD

This invention belongs to the technical field of alloyed materials technology, and in particularly involves an aluminum alloy applied to manufacture aluminum/steel cladding plates that are resistant to high temperature brazing, and the corresponding heat treatment process after cold-rolled cladding. Utilizing this aluminum alloy, it can expand the working window of temperature and time of heat treatment for aluminum/steel cladding plates. The produced aluminum/steel cladding plates is workable and resistant to high temperature brazing.

BACKGROUND

The aluminum/steel cladding plates have been widely used in various fields since their combined advantages of high strength from steel and corrosion resistance from aluminum and the solved problem of welding between aluminum and steel. It is too difficult to produce aluminum/steel cladding plates in conventional way because of the difference of physical and chemical properties, especially melting point and mechanical properties, and the formation of many types of intermetallic phases between aluminum and steel. At present, the rolled cladding is the most widely used method for producing aluminum/steel cladding plates. The Al alloy in aluminum/steel plates is usually ordinary 1050 Al alloy. After Al/St rolled cladding, the serious deformation of grains leads to decreasing of ductility, moreover, further processing wouldn't be achieved. Therefore, a suitable annealing process is necessary for restoring the grains. During heat treatment, at ordinary 1050 Al alloy/steel interface, lots of brittle Fe—Al compounds would appear. By alloying with Si, the interface compounds could be suppressed. However, during brazing over 600▯, the brittle Fe—Al compounds would also outbreak and further induce interface brittleness and cracks for both pure Al/St and Al—Si/St if the annealing process is not suitable. The above possible defects lead to the limited working window of the heat treatment and therefore lower production stability.

Because of the large difference of physical properties between steel and aluminum, especially the melting point, the aluminum alloy played the main role during the interfacial diffusion reaction when brazing above 600° C. Thus, by alloying aluminum alloy, it can be expected different microstructure and amount of intermetallic compounds at the interface region. In the studies, it indicated that the formation of interfacial compound could effectively be inhibited by alloying with Si to Al alloy. By microalloying with Er, it could change the growth kinetics of interfacial compound, alter the distribution of interfacial brittle compound, and finally affect the interfacial bonding property. The combination of these two types of microalloying elements would further improve interfacial performance of Al/steel cladding plates.

In the invention, the composition of the aluminum alloy in the aluminum/steel cladding plates is 0.055~0.10 wt. % Er and 0.76~0.78 wt. % Si in weight percent. By adding both Er and Si, the generation of brittle interfacial compounds can be effectively inhibited. The corresponding working window would be broadened, which means the improvement of the production stability. Therefore, by heat treatment parameter optimizing and alloy composition design on the aluminum alloy, the amount and morphology of interface phases can be adjusted to obtain the outstanding property for high temperature brazing.

SUMMARY OF THE INVENTION

The objective of the present invention is to solve the problem of the cracking and fracture at interface of the Al/St cladding plates from the formed continuous interfacial compound after high temperature (610° C.±10° C.) brazing.

The present invention provides aluminum alloy applied to manufacturing aluminum/steel cladding plates which are resistant to high temperature brazing, the aluminum alloy comprising 0.76%±0.10% by weight of microalloying element Si and 0.055-0.10% by weight of microalloying element Er, with the balance being aluminum.

An aluminum/steel cladding plate is provided, which comprises an aluminum foil made of aluminum alloy cladded on a steel sheet. The aluminum alloy comprises 0.76%±0.10% by weight of microalloying element Si and 0.055-0.10% by weight of microalloying element Er, with the balance being aluminum. The steel sheet can be made of fine ferrite steel with ultra-low carbon content, or steel with carbon content less than 0.01 wt %.

A method for manufacturing an aluminum/steel cladding plate is provided, which comprises: providing an aluminum foil made of an aluminum alloy comprising 0.76%±0.10% by weight of microalloying element Si and 0.055-0.10% by weight of microalloying element Er with the balance being aluminum; cladding the aluminum foil with a steel sheet via cold rolling with 55±2% deformation to form a raw aluminum/steel cladding plate; annealing the raw aluminum/steel cladding plate to obtain the aluminum/steel cladding plate.

The raw aluminum/steel cladding plate can be annealed at a temperature of 510▯ for 33-100 h, or 515▯ for 16-100 h, or 520▯ for 12-72 h, or 525▯ for 8-60 h, or 535▯ for 4-60 h.

The aluminum alloy and corresponding heat treatment process applied to manufacture Al/St cladding plates which are resistant to high temperature brazing, of which the steel substrate is fine ferrite steel with ultra-low carbon content, or steel with carbon content less than 0.01 wt %.

The Al/St cladding plates after the heat treatment could be applied to high temperature brazing at 610° C.±10° C.

The composition of aluminum alloys are selected to be high-pure Al, Er-containing Al alloy, Si-containing Al-alloy and Er and Si containing Al alloys. After melting, hot rolling and cold rolling into foils, the aluminum alloys are then cladded with steel by cold rolling. Afterwards, heat treatment and simulated brazing are adopted in Al/St cladding plates. Finally, the interface morphology of the Al/steel plates are then observed with optical microscopy (OM).

Based on the OM observation, if there is no intermetallic compound at the interface after both the heat treatment and the stimulated brazing, the interface bonding strength of Al/St cladding plates is ensured. If there is discontinues intermetallic compound at the interface after the stimulated brazing, the interface bonding strength of Al/St cladding plates is also ensured. However, if there is continues intermetallic compound at the interface after the stimulated brazing, the clad plates are of low interface bonding strength and may fracture at the interface during the service time.

The advantages of the technical solutions of the present invention lie in that:

The composition design is based on the two different effects of the alloying elements. Si can hinder the generation of interfacial compound between Fe and Al, and Er can fragment the interfacial compound. With the synergetic effect of Si and Er, the interface bonding strength after simulated brazing can be enhanced between Fe and Al.

When optimization of the working window, it was considered both the mechanical property of the steel and the resistant to high temperature brazing of the clad plate. After heat treatment, Al/steel clad plates could be obtained with not only the relative high elongation to subsequent cold working (such as pipe bending), but also the high interface bonding strength due to the elimination of the brittle Fe—Al compounds.

The invention will be further explained below in conjunction with the accompanying drawings and the embodiments.

DETAILED DESCRIPTION OF THE EMBODIMENTS

The following is to make a further explanation on the invention combining with some practical examples, but the invention is not limited to them.

Alloy ingots were prepared by smelting in graphite crucible and then casting into iron mould. The raw materials were pure Al and master alloys of Al-6Er and Al-35Si (in weight percent). At smelting temperature of 790±10° C., Al ingots should be smelted firstly, then add master alloys of Al—Er and Al—Si into it. After the master alloy melting, use hexachloroethane to remove gas, stir vigorously and then cast into iron ingots after keeping it for a while until every element distributes uniformly. Prepare alloys of different compositions, measuring its actual composition through XRF, in which the measurement error of Si concentration is about 0.1 wt %, as shown in table 1.

TABLE 1

Concentration of the alloys

| Experimental samples | Nominal concentration (wt. %) | | | Verified concentration (wt. %) | | |
|---|---|---|---|---|---|---|
| | Er | Si | Al | Er | Si | Al |
| A1 | 0 | 0 | balance | 0 | 0 | balance |
| A2 | 0.05 | 0 | balance | 0.055 | 0 | balance |
| A3 | 0.10 | 0 | balance | 0.10 | 0 | balance |
| A4 | 0.05 | 0.8 | balance | 0.055 | 0.78 | balance |
| A5 | 0.10 | 0.8 | balance | 0.098 | 0.76 | balance |

Roll the prepared Al alloy into foils and cold-rolled clad of 55±2% deformation with steel. After that, heat treatment and stimulated brazing are conducted. Through cold rolling between Al and steel, grains deform seriously and the ductility of cold rolled cladding plates decrease. In order to satisfy the further process, the cladding plates need to be annealed. Annealing at different temperature for different times on the Al/St cladding plates, get recrystallization finishing time at each temperature from the microhardness-annealing time curve. The stimulated brazing is adopted to ensure the high temperature application. The simulated brazing heat treatment in this experiment is done as follows: increase the temperature of aluminum/steel cladding plates from room temperature to 625▯ within 30 min, keep at 625 ▯ for 10 min, then cool in the air.

EXAMPLE 1

Figure 1:
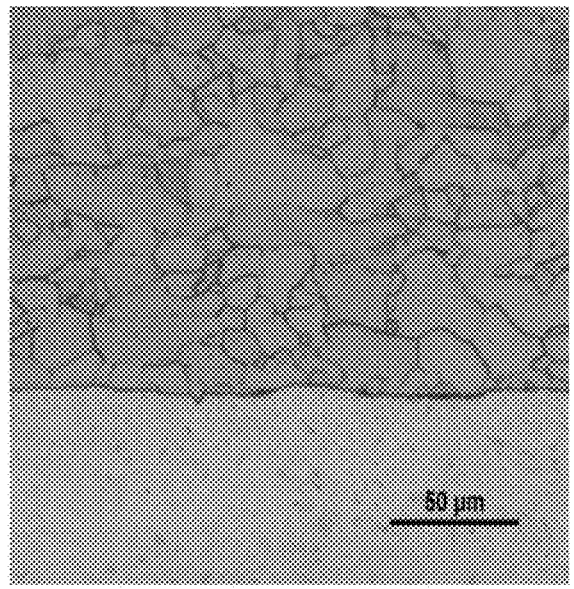
FIG. 1 is a graph representing the optical images of the interface for Al-0.76Si-0.1Er/St upon 520° C./18 h annealing and stimulated brazing.

Upon annealing and simulated brazing, there is no interfacial compound in sample A5 (Al-0.8Si-0.10Er/St), and the interfacial bonding is fine, as shown in FIG. 1.

EXAMPLE 2

Figure 2:
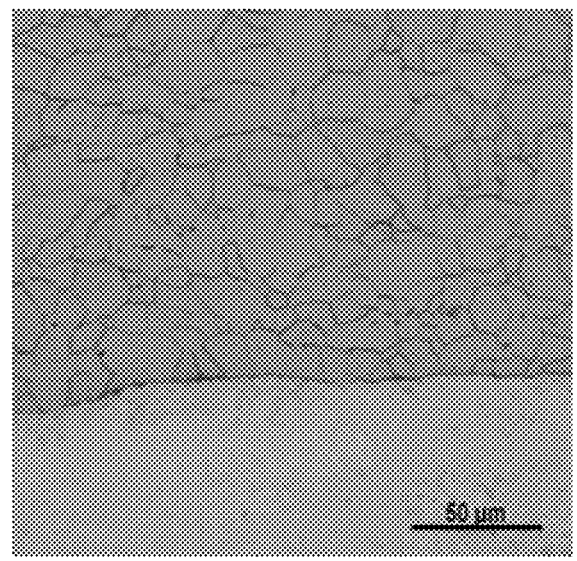
FIG. 2 is a graph representing the optical images of the interface for Al-0.78Si-0.055Er/St upon 520° C./18 h annealing and stimulated brazing.

Upon annealing at 520° C. for 18 h and stimulated brazing, there is no interfacial compound in sample A4 (Al-0.8Si-0.05Er/St), and interfacial bonding is fine, as shown in FIG. 2.

Comparative Example 1

Figure 3:
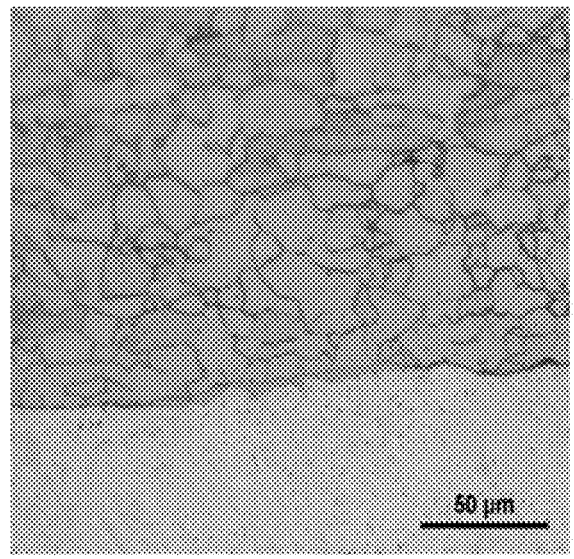
FIG. 3 is a graph representing the optical images of the interface for Al-0.1Er/St upon 520° C./18 h annealing and stimulated brazing.

Upon annealing at 520° C. for 18 h and stimulated brazing, there is discontinuous interfacial compound in sample A3 (Al-0.10Er/St), and its thickness is small, as shown in FIG. 3.

Comparative Example 2

Figure 4:
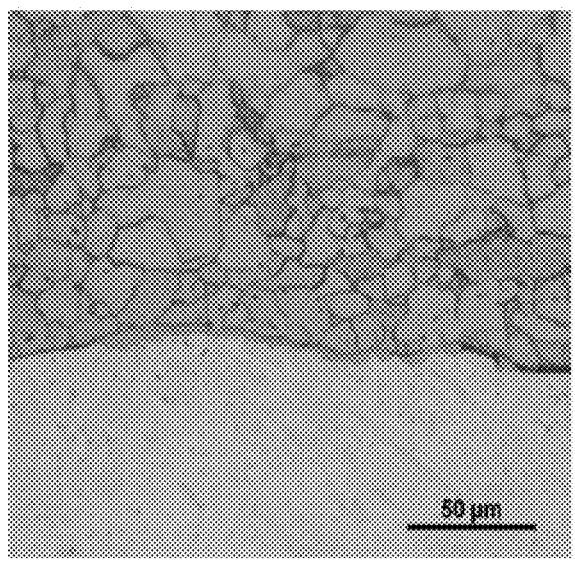
FIG. 4 is a graph representing the optical images of the interface for Al-0.055Er/St upon 520° C./18 h annealing and stimulated brazing.

Upon annealing at 520° C. for 18 h and stimulated brazing, there is discontinuous interfacial compound in sample A2 (Al-0.05Er/St), as shown in FIG. 4. And the thickness of the interfacial compound is far smaller than that of pure Al/St after heat treatment with the parameters. However, its performance is not so good as Al—Si—Er/St.

Comparative Example 3

Figure 5:
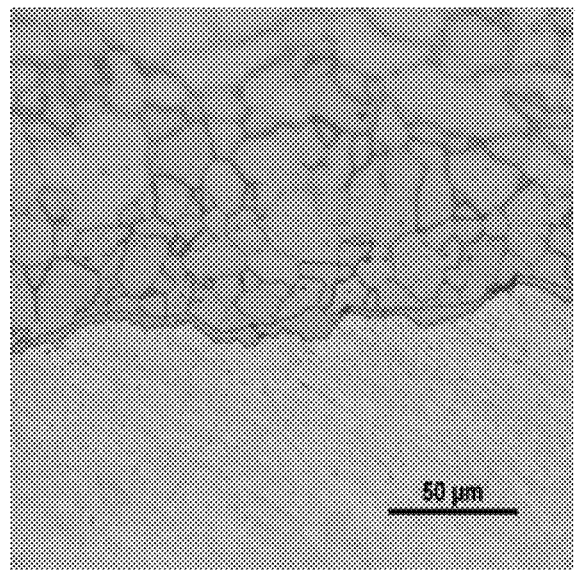
FIG. 5 is a graph representing the optical images of the interface for pure Al/St upon 520° C./18 h annealing and stimulated brazing.

Upon annealing at 520° C. for 18 h and stimulated brazing, there is a lot of brittle interfacial compound with layered continuous distribution in sample Al (pure Al/St), as shown in FIG. 5. It would result in separation between steel and Al. The existence of interfacial compound would decrease the bonding strength seriously.

EXAMPLE 3

Figure 6:
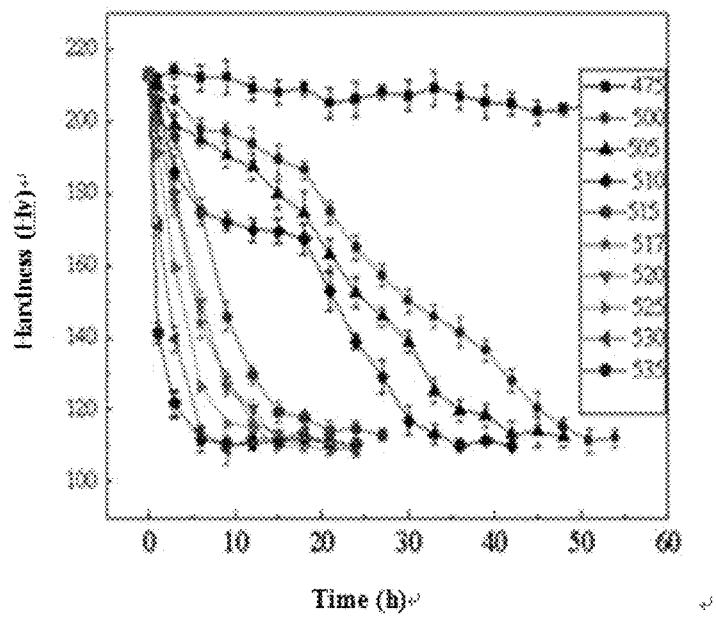
FIG. 6 is a graph representing the relationship between the microhardness and annealing time of steel side in Al/St cladding plates at different annealing temperatures.

The recrystallization finishing time at different annealing temperatures could be obtained from microhardness measurement after annealing Al/St cladding plates at different temperature for different times. Testing temperatures are 475, 500, 505, 510, 515, 517, 520, 525, 530, 535° C., respectively. The results indicate that, the steel does not recrystallize after annealing at 475° C. for 60 h. The recrystallization of steel occurs after annealing at 500° C. for 51 h, or at 505° C. for 42 h, or at 510° C. for 33 h, or at 515° C. for 16 h, or at 520° C. for 12 h, or at 525° C. for 8 h, or at 530° C. for 6 h, or at 535° C. for 4 h. The details see FIG. 6.

EXAMPLE 4

Figure 7:
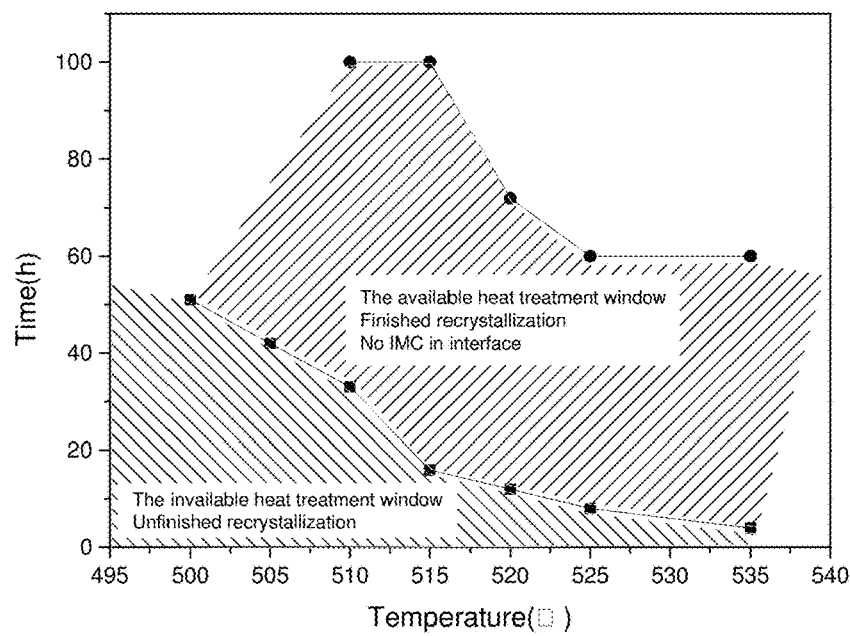
FIG. 7 is a diagram representing the interface characteristics in Al—Si—Er/St cladding plates relative to annealing temperature and time after annealing and further simulated brazing process.

The samples A4 and A5 (Al—Si—Er/St) was annealed and further stimulated brazed. By observing interface, it was found that there was no intermetallic compound formed after annealing at 510° C. for 33-100 h and further stimulated brazing. With the increasing annealing temperature, the heat treatment window with no interfacial compound became narrower to 16-100 h at 515° C., 12-72 h at 520° C., 8-60 h at 525° C., and 4-60 h at 535° C. The detail is shown in FIG. 7.

The invention claimed is:

1. An aluminum/steel cladding plate, comprising an aluminum foil made of an aluminum alloy cladded on a steel sheet, wherein the aluminum alloy comprising 0.76%±0.10% by weight of microalloying element Si and 0.055-0.10% by weight of microalloying element Er, with the balance being aluminum.

2. An aluminum alloy applied to manufacturing aluminum/steel cladding plates which are resistant to high temperature brazing, the aluminum alloy consisting of 0.76%±0.10% by weight of microalloying element Si and 0.055-0.10% by weight of microalloying element Er, with the balance being aluminum.

3. A method for manufacturing an aluminum/steel cladding plate, comprising:
    providing an aluminum foil made of an aluminum alloy comprising 0.76%±0.10% by weight of microalloying element Si and 0.055-0.10% by weight of microalloying element Er with the balance being aluminum;
    cladding the aluminum foil with a steel sheet via cold rolling with 55±2% deformation to form a raw aluminum/steel cladding plate; and annealing the raw aluminum/steel cladding plate to obtain the aluminum/steel cladding plate.

4. The method for manufacturing an aluminum/steel cladding plate according to claim 3, wherein the raw aluminum/steel cladding plate is annealed at a temperature of 510° C. for 33-100 h, or 515° C. for 16-100 h, or 520° C. for 12-72 h, or 525° C. for 8-60 h, or 535° C. for 4-60 h.

* * * * *